(12) United States Patent
Johnson et al.

(10) Patent No.: US 9,710,250 B2
(45) Date of Patent: Jul. 18, 2017

(54) MECHANISM FOR SAFE AND REVERSIBLE ROLLING UPGRADES

(71) Applicant: MICROSOFT CORPORATION, Redmond, WA (US)

(72) Inventors: James E. Johnson, Bellevue, WA (US); Luis Irun-Briz, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 13/928,871

(22) Filed: Jun. 27, 2013

(65) Prior Publication Data

US 2014/0282469 A1    Sep. 18, 2014

Related U.S. Application Data

(60) Provisional application No. 61/793,575, filed on Mar. 15, 2013.

(51) Int. Cl.
G06F 9/44    (2006.01)
G06F 9/445   (2006.01)

(52) U.S. Cl.
CPC ............ *G06F 8/65* (2013.01); *G06F 8/60* (2013.01); *G06F 8/61* (2013.01); *G06F 8/62* (2013.01); *G06F 8/71* (2013.01)

(58) Field of Classification Search
CPC ..... G06F 8/60; G06F 8/61; G06F 8/62; G06F 8/65; G06F 8/71
USPC .......................... 717/168, 170, 171, 174, 176
See application file for complete search history.

(56) References Cited

U.S. PATENT DOCUMENTS

| | | | |
|---|---|---|---|
| 5,008,814 A | * | 4/1991 | Mathur .................... 709/221 |
| 7,353,311 B2 | * | 4/2008 | Murdock et al. ............ 710/244 |
| 7,653,911 B2 | * | 1/2010 | Doshi ................... G06F 9/546 |
| | | | 717/170 |

(Continued)

OTHER PUBLICATIONS

Ajmani, Sameer, "Automatic Software Upgrades for Distributed Systems," MIT, 2004.* Monk and Sommerville, "Schema Evolution in OODBs Using Class Versioning," Computing Department, Lancaster University, SIGMOD Record, vol. 22, No. 3, Sep. 1993.*

(Continued)

*Primary Examiner* — Wei Zhen
*Assistant Examiner* — Andrew M Lyons
(74) *Attorney, Agent, or Firm* — Shook, Hardy & Bacon L.L.P.

(57) ABSTRACT

Methods, systems, and computer storage media for updating instances of a service application within nodes of a data center are provided. The system includes a state machine equipped for designating an earlier version of software running on some instances as a basement version and a newer version of software running on other instances as a latest version. The system also includes a compatibility mechanism responsible for allowing the basement version, the latest version, and other versions of the service application therebetween to interact using a data structure associated within the earlier version, or lowest common version of the service application. The compatibility mechanism is located apart from core logic of the service application. The activities of the state machine and the compatibility mechanism allow the instances to communicate with each other (using the lowest common version) while exposing just the validated version(s) of the service application to the client.

20 Claims, 5 Drawing Sheets

(56) References Cited

U.S. PATENT DOCUMENTS

| | | | |
|---|---|---|---|
| RE41,162 E * | 3/2010 | Engel et al. | 717/173 |
| 7,730,450 B2 * | 6/2010 | Mercer | 717/120 |
| 7,757,226 B2 | 7/2010 | Srivastava et al. | |
| 8,370,831 B1 * | 2/2013 | Eng et al. | 717/178 |
| 2003/0149970 A1 | 8/2003 | Shanbhogue et al. | |
| 2003/0192031 A1 * | 10/2003 | Srinivasan et al. | 717/120 |
| 2004/0250239 A1 * | 12/2004 | Fox | G06F 9/4435 717/116 |
| 2005/0203953 A1 * | 9/2005 | McGee | H04L 41/0803 |
| 2005/0246423 A1 * | 11/2005 | Starbuck | H04L 12/58 709/206 |
| 2006/0218541 A1 * | 9/2006 | Saito | G06F 9/44521 717/146 |
| 2006/0259909 A1 * | 11/2006 | Passero | G06F 9/541 719/312 |
| 2008/0263535 A1 * | 10/2008 | Dias et al. | 717/168 |
| 2009/0106403 A1 * | 4/2009 | McGee | G06F 9/44505 709/221 |
| 2009/0265699 A1 * | 10/2009 | Toeroe | 717/168 |
| 2011/0191292 A1 * | 8/2011 | Chen | G06F 17/30 707/622 |
| 2012/0222026 A1 | 8/2012 | Excoffier et al. | |
| 2013/0151681 A1 * | 6/2013 | Dournov | G06F 8/67 709/223 |
| 2014/0101646 A1 * | 4/2014 | Buzaski et al. | 717/168 |
| 2014/0244708 A1 * | 8/2014 | Taine | H04L 65/40 709/201 |

OTHER PUBLICATIONS

Monk, Simon, "A Model for Schema Evolution in Object-Oriented Database Systems," Computing Department, Lancaster University, 1993.*

Skarra and Zdonik, "The Management of Changing Types in an Object-Oriented Database," OOPSLA 1986 Proceedings, pp. 483-495, Apr. 1986.*

Hohpe, Gregor and Woolf, Bobby, "Enterprise Integration Patterns," Chapter 1, Messaging Patterns, 2003, last retrieved from http://www.enterpriseintegrationpatterns.com/patterns/messaging/Chapter1.html on Mar. 3, 2017.*

Stack Exchange, "Strategy for backwards compatibility of persistent storage," Apr. 4, 2012, last retrieved from http://softwareengineering.stackexchange.com/questions/142916/strategy-for-backwards-compatibility-of-persistent-storage on Mar. 3, 2017.*

Ajmani, Sameer, "Automatic Software Upgrades for Distributed Systems", In Doctoral Dissertation, Apr. 30, 2003, 23 pages.

Iulian, et al., "Cloud Software Upgrades: Challenges and Opportunities", In International Workshop on the Maintenance and Evolution of Service-Oriented and Cloud-Based Systems, Sep. 26, 2011, 10 pages.

Bhattacharya, et al., "Dynamic Updates for Web and Cloud Applications", In Proceedings of Workshop on Analysis and Programming Languages for Web Applications and Cloud Applications, Jun. 6, 2010, 5 pages.

Mukerjee, et al., "SQL Azure as a Self-Managing Database Service: Lessons Learned and Challenges Ahead", In IEEE Data Engineering Bulletin, Dec. 2011, 10 pages.

* cited by examiner

MECHANISM FOR SAFE AND REVERSIBLE ROLLING UPGRADES

RELATED APPLICATION

This patent application claims priority to U.S. Application No. 61/793,575, filed Mar. 15, 2013, which is incorporated herein by reference in the entirety.

BACKGROUND

Large-scale networked systems are commonplace systems employed in a variety of settings for running service applications and maintaining data for business and operational functions. For instance, a data center within a networked system may support operation of a variety of differing service applications (e.g., web applications, email services, search engine services, etc.). These networked systems typically include a large number of nodes distributed throughout one or more data centers, in which each node resembles a physical machine or a virtual machine running on a physical host. Due partly to the large number of the nodes that may be included within such large-scale systems, rolling out an update to program components of one or more service applications can be a time-consuming and costly process.

Similar to other articles of software, the service applications running on these networked systems require updates to the program components installed on the nodes of the data centers. Therefore, it is necessary to implement a process that takes down, installs new version(s) of software, and brings back online the program components within the nodes. Generally, taking down a large number of program components simultaneously will create unavailability issues with the service application(s) experiencing the update.

Accordingly, highly available service applications, which have their underlying software updated at various times during their operational lifetime, require that a large portion of the service application remain online while the update is occurring. As the service applications grow in complexity and load, the process for conducting an update should include the ability to test features of new versions of software, to limit risk by phasing the rollout of an update, and to retract the rollout of the update (i.e., rollback) if failures are detected during testing. (This is especially true if the service application shares state between component programs (e.g., role instances) that reside at different versions of software. Presently, conventional solutions are unable to achieve the three attributes above while, at the same time, maintaining the service application as highly available to clients. Instead, these conventional solutions are ad-hoc techniques that either permeate the service as a whole, creating loss of performance and limiting availability, or treat the mid-update state as an aberration with significant loss of capability.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention introduce computer systems, computerized methods, and computer-readable media for providing a reliable mechanism for updating a service application's component programs (e.g., role instances) within nodes of a distributed cloud-computing infrastructure. Embodiments of the update mechanism introduced herein allow for generating stability during rollout of the update (i.e., upgrading a version of the service application), providing safety during rollback of the update (i.e., downgrading a version of the service application), and isolating mid-rollout complexity away from core logic of the service application (e.g., locating a version capability mechanism within a data access layer), while maintaining high availability of the service application. As such the update mechanism of the present invention mitigates the problematic results of the piecemeal conventional solutions currently in place for updating software.

Initially, as used herein, "nodes" represent physical hosts (e.g., computing devices) capable of running tenants of a customer's service application within the cloud-computing infrastructure, a data center, a distributed computing platform, or any other networked system. As used herein, the term "tenants" broadly refers to instances of one or more roles of a service application. These "instances" typically represent copies or replications of at least one role, which resembles a component program, for supporting particular functional aspects of the service application.

Embodiments provide a reliable update mechanism that automatically performs an upgrade to portions of a service application while maintaining high availability, generating stability during rollout, providing safety during rollback, and isolating mid-rollout complexity away from core logic of a service application would mitigate the problematic results of the piecemeal update solutions currently in place. Further, the self-learning system, as described by embodiments of the present invention, is able to detect anomalies before functionality of the nodes and/or the service applications is adversely affected, thereby preventing internal failures and exploitation by external threats.

Generally, the update mechanism of the present invention is designed to accomplish the following efficiencies: providing a state machine that defines stages for rolling out and rolling back an update to a service application; isolating the protocol and shared state version changes from core logic of the service application; providing consistent operation during the update as perceived by a client; allowing for reversing the update without requiring human intervention, and enforcing rules that govern how data structure of shared state may change from version to version without loss of availability Various approaches discussed hereinbelow demonstrate the way in which these efficiencies are realized.

Typically, the service application provides to a fabric of the cloud-computing infrastructure an ongoing view of what its role instances are doing. As used herein, the "state" generally represents an ongoing view of aspects of the running service application, such as the configuration requirements (e.g., service license agreement (SLA)), running availability data, and/or number of instances of a service application. In operation, if a version of a piece of software is modified, the state is changed and replicated to reflect the modification.

In another example of state, for the purpose of explanation, assume a particular service application is running on a cloud-computing infrastructure. The service application may be equipped with a set of configuration requirements (e.g., number of instances and set-up of those instances). This set of configuration requirements is held in the fabric of the cloud-computing infrastructure, or "fabric controller," and is employed to manage the service application. The fabric controller maintains and manages various configuration requirements of the service application, or states, which govern what actions the fabric controller may take in a given situation with respect to the service application. In another embodiment, the state may be affected by terms within an SLA that is associated with the service application (e.g., running availability data of the service application). As such, the state does not necessarily refer to simply a configuration of an individual role instance of a service application. By understanding the state, the update mechanism—in cooperation with the fabric controller—is enabled to deploy a new version of a service application while managing how features of the new version are exposed to the client and how data structures of information from differing versions of the service application are stored and communicated.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates substantially similar or identical items.

DETAILED DESCRIPTION

Figure 1:
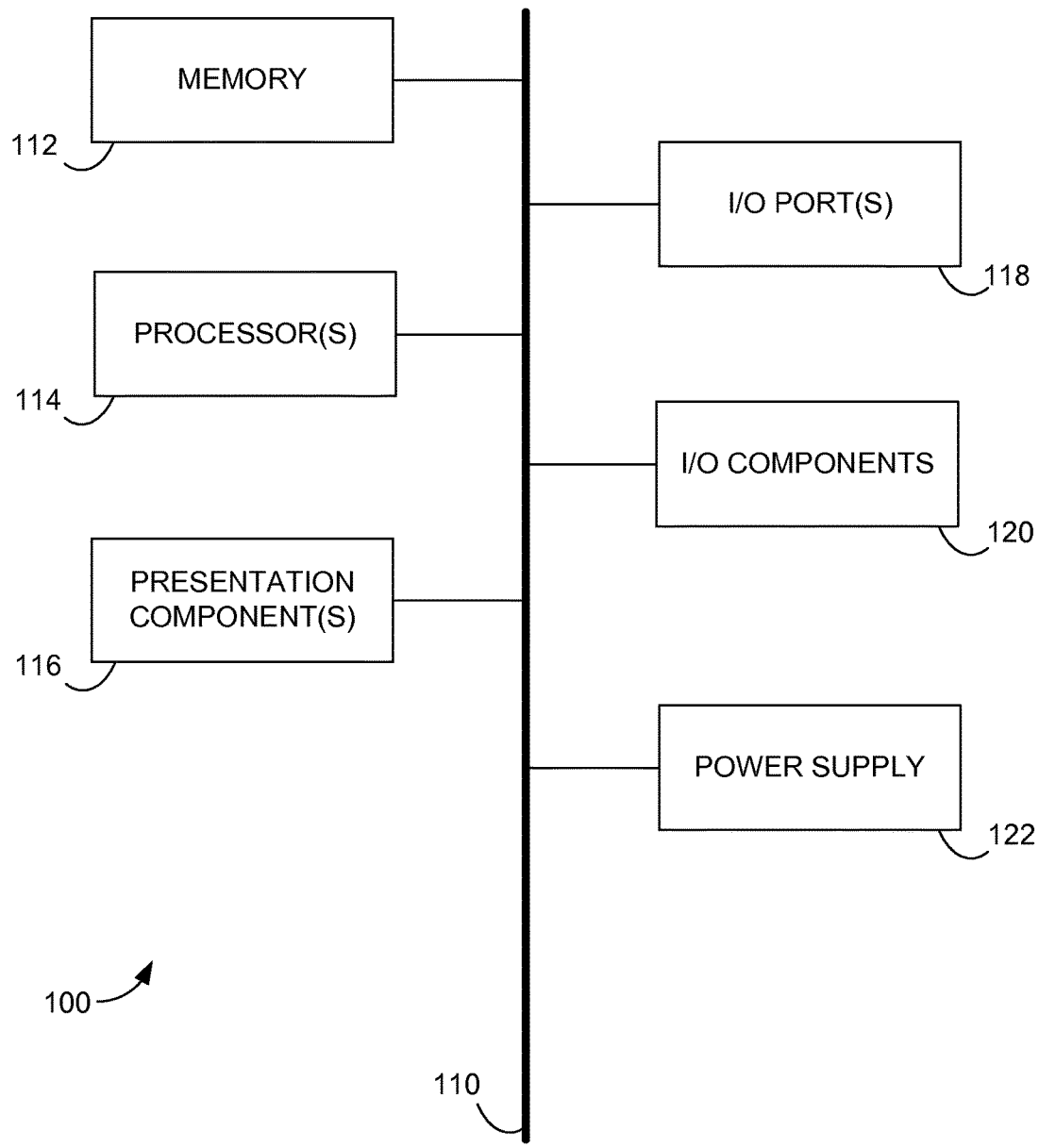
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Overview of Embodiments of the Invention

Embodiments of the present invention relate to methods, systems, and computer-storage media having computer-executable instructions embodied thereon that, when executed, perform methods in accordance with embodiments hereof, for managing a rolling update of a service application across distributed nodes of a cloud-computing infrastructure. The nodes generally represent servers (e.g., computing devices) within the context of a distributed computing environment that support operations of service applications running on top of the servers in a distributed fashion. These nodes may be geographically contained within data centers that, when interacting together, comprise the topology of the cloud-computing infrastructure.

In one aspect, embodiments of the present invention relate to one or more computer storage media that has computer-executable instructions embodied thereon that, when executed, perform a method for performing an upgrade to a service application that is transparently reversible to a client of a cloud-computing infrastructure. In embodiments, the method involves receiving instructions to upgrade the service application running on top of the cloud-computing infrastructure. Typically, the service application includes core logic for carrying out core operations and supportive code that is distinct from the core logic.

The method may further involve maintaining a first set of role instances at an earlier first version of the service application. As discussed more fully below, the role instances respectively represent a replication of at least one role, which resembles a component program that supports particular functional aspects of the service application. At some point, the first version is designated as a basement version within a state machine.

Upon releasing a package upon the service application, a second set of role instances is upgraded to a newer second version of the service application in accordance with the package. The second version may be designated as a latest version. A compatibility mechanism located in a subset of the supportive code is responsible for allowing the basement version, the latest version, and other versions of the service application therebetween to interact. Generally, the upgrade of the second set of role instances to the second version is transparent to the client. In embodiments, the compatibility mechanism resides within the data-access layer of the cloud-computing infrastructure and is capable of writing information from the first and second role instances to fields in a data store.

In another aspect, embodiments of the present invention relate to a computerized method for isolating a data-structure transformation between versions of role instances of a cloud-computing infrastructure. In embodiments, the method involves receiving at a compatibility mechanism information from a first set of role instances of a service application. Initially, the first set of role instances reside at a first version of the service application and format their information according to a first data structure. Further, the compatibility mechanism may instantiated within a data-access layer of the cloud-computing infrastructure or any other location that is apart from core logic of the service application. Generally, the core logic is defined as software specifically programmed for carrying out core operations of the service application.

The method may include receiving at the compatibility mechanism information from a second set of role instances of the service application. At some previous time, the second set of role instances were upgraded to a second version of the service application. Upon receiving the upgrade, the second set of role instance format their information according to both the first data structure and a second data structure in parallel. Upon receiving the information from the first and second set of role instances, the compatibility mechanism writes the information from the first set of role instances to a first field and writes the information from the second set of role instances to the first field and a second field, respectively, according to the first and second data structure. In this way, the compatibility mechanism allows the first and second set of role instances to interact using information in the first data structure.

In a third aspect, an exemplary computer system is provided for performing a method that upgrades a service application in a manner transparent to a client of a cloud-computing infrastructure. In embodiments, the computer system includes a processing unit coupled to a computer storage medium that stores a plurality of computer software components executable by the processing unit. The computer software components include a first set of role instances, a second set of role instances, a state machine, and a compatibility mechanism.

Initially, the first set of role instances are configured for running a first version of the service application upon one or more nodes, respectively, within the cloud-computing infrastructure. In embodiments, the service application includes protocol definitions that expose features of the first version to the client of the cloud-computing infrastructure. Upon receiving an upgrade, the second set of role instances are configured for running a second version of the service application upon one or more nodes, respectively, within the cloud-computing infrastructure. With regard to the second set of role instances, the protocol definitions of the service application prevent exposure of features specific to the second version to the client.

In an exemplary embodiment, the state machine is equipped for designating the first version as a basement version and the second version as a latest version. The compatibility mechanism is responsible for allowing the basement version, the latest version, and other versions of the service application therebetween to interact using a data structure associated within the first version. As such, the activities of the state machine and the compatibility mechanism allow the role instances to communicate with each other using the lowest common version of the service application while exposing just the validated version(s) of the service application to the client.

Embodiments, of the present invention relate to updating component programs accommodated by nodes that are distributed throughout a distributed computing environment, or data center(s). In one instance, the nodes represent computing devices capable of running role instances (i.e., tenants) of the service application within a distributed computing platform. As used herein, the term "roles" or role instances is not meant to be limiting, but may include any replication of at least one role, which generally resembles a component program that supports particular functional aspects of a service application.

As such, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model, or service level agreement (SLA), delineates how many instances of each of the one or more roles to place within the data center, where each of the instances is a replication of the particular class of component, or role. In other words, each role represents a collection of instances of each class of components, where the service application may have any number of classes of components for carrying out functions thereof.

Multiple and varied implementations and embodiments are described below. Having briefly described an overview of embodiments of the present invention, the following section describes an operating environment suitable for implementing embodiments of the present invention. The following sections describe illustrative aspects of the techniques for carrying out embodiments of the present invention.

Exemplary Operating Environment

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media.

Computer storage media includes volatile and non-volatile, removable and nonremovable media implemented in any method or technology for storage of information such as computer readable instructions, data structures, program modules, or other data. Computer storage media include, but are not limited to, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Computer storage media excludes signals per se.

In contrast, communication media typically embody computer-readable instructions, data structures, program modules, or other data in a modulated data signal, such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media; however, as defined herein, computer storage media does not include communication media.

Memory 112 includes computer-storage media in the form of volatile and/or nonvolatile memory. The memory may be removable, nonremovable, or a combination thereof. Exemplary hardware devices include solid-state memory, hard drives, optical-disk drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

Ports 118 allow computing device 100 to be logically coupled to other devices including I/O components 120, some of which may be built in. Illustrative components include a microphone, joystick, game pad, satellite dish, scanner, printer, wireless device, etc.

Architecture of Exemplary Cloud-Computing Infrastructures

Figure 2:
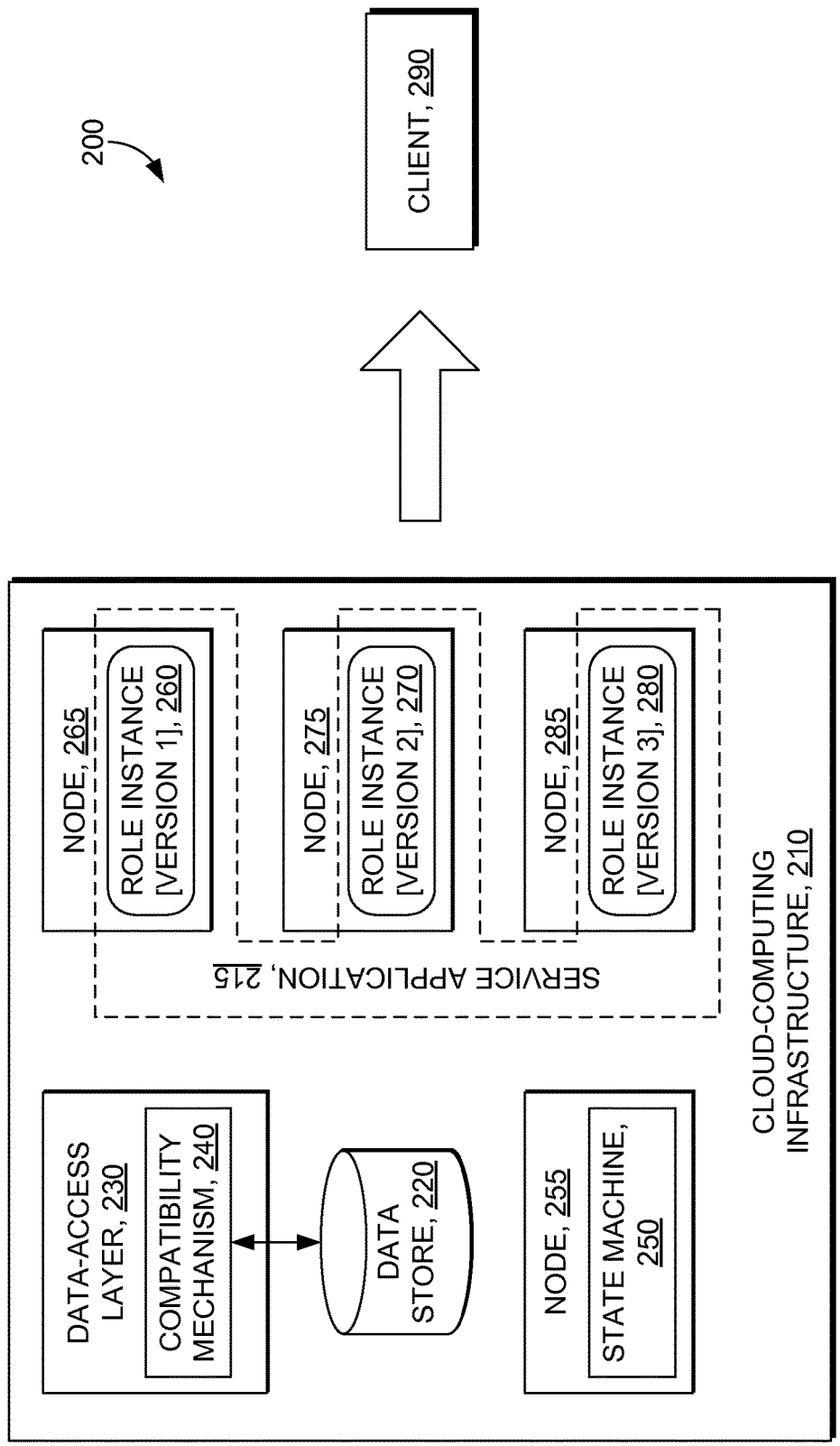
FIG. 2 is a block diagram illustrating an architecture of an exemplary cloud-computing infrastructure, suitable for use in implementing embodiments of the present invention, that is configured to manage a rolling update of a service application within a set of nodes.

With reference to FIGS. 1 and 2, nodes 255, 265, 275, and 285 may be implemented by the exemplary computing device 100 of FIG. 1. Further, role instances 260, 270, and 280 may be provided with access to portions of the memory 112 of FIG. 1 and/or allocated an amount of processing capacity available at the processors 114 of FIG. 1 for conducting operations that support their respective service applications.

Turning now to FIG. 2, a block diagram illustrating an architecture 200 of an exemplary cloud-computing infrastructure 210 suitable for use in implementing embodiments of the present invention, is shown. The cloud-computing infrastructure includes a fabric (not shown), a state machine 250 in communication with the fabric, and a compatibility mechanism 240 that is located in supportive code that is removed from core logic of service application 215. As illustrated, the supportive code is represented by a data-access layer 230 of the cloud-computing infrastructure. But, it should be noted, the data-access layer is just one embodiment of support code that supports functionality of the service application and various other embodiments of the supportive code are contemplated by other embodiments of the present invention. For instance, the supportive code may take the form of a subset of code that is on the edge of the service application's 215 core logic. Accordingly, the supportive code is defined as any code that is separate from, outside of, and/or distinct from the service application's core logic, which is defined herein as software specifically programmed for carrying out core operations of the service application.

The distributed computing environment of FIG. 2 includes a data store 220 configured to accommodate and support operation of component programs, or instances of roles, of a particular service application according to the fabric controller 210. It will be understood and appreciated that the data store 220 shown in FIG. 2 is merely an example of one suitable for accommodating one or more service applications and is not intended to suggest any limitation as to the scope of use or functionality of embodiments of the present invention. Neither should the data store 220 be interpreted as having any dependency or requirement related to any single resource, combination of resources, or set of APIs to access the resources and/or nodes.

In one aspect of the present invention, the data store 220 is configured to hold information that is received from the role instances 260, 270, and 280 of the service application 215 via the compatibility mechanism 240. Based on the version of software that each of the role instances 260, 270, and 280 are running, the data structure of this information may vary from instance to instance. For example, the version 1 running on role instance 260 may generate information according to a first data structure, which is entered into a first set of data fields within the data store 220, while version 2 running on role instance 270 may generate information according to a second data structure, which is entered into a second set of data fields within the data store 220.

In order to support the transitions carried out by the state machine 250, discussed more fully below, changes to the data structures of the information from the role instances 260, 270, and 280 are implemented by the compatibility mechanism and adhere to one or more predefined rules. This is because the data structures from differing versions of software are different from one another. Furthermore, fields within tables accessible in the data store 220, or "property bag definitions," may vary according to the data structures of the software versions, respectively. In this way, fields corresponding to data structures of varying versions of software are typically added as new versions are rolled out and removed after the last version that employed an earlier data structure is updated.

In particular, for any state that is extended (e.g., rolling out a new version of software within the service application 215), the state extension includes the addition of new fields within the data store 220 that are associated with the new version of software. So, in order to ensure interaction between later and earlier versions, the later versions of software or recently updated versions (e.g., version 3) are created to generate information that may be accessed and read by previous versions (e.g., versions 1 and 2). For example, according to embodiments of the present invention, role instance 280 that is running version 3 is configured to output information in three parallel streams: a first stream with a data structure corresponding to version 1 running on role instance 260, a second stream with a data structure corresponding to version 2 running on role instance 270, and a third stream with a data structure corresponding to version 3, which is the latest version running in the service application 215. The compatibility mechanism 240 maintains a mapping that directs to the information within the streams to an appropriate field.

Regarding the example above, the compatibility mechanism 240 may apply the mapping to the three parallel streams from role instance 280 to target the first stream to a first data field with the data store 220 (holding information formatted in a data structure associated with version 1), to target the second stream to a second data field with the data store 220 (holding information formatted in a data structure associated with version 2), and to target the third stream to a third data field with the data store 220 (holding information formatted in a data structure associated with version 3). In this way, later versions of software are programmed to output information in varying data structures to support earlier versions of the service application 215. Or, when configuring the data structure of the outputted streams, the later versions of software may be designed to detect updates to versions of the service application 215 or to detect previously defined fields that are not matched by updates to the new fields.

The data streams from the role instances 260, 270, and 280 are received by the compatibility mechanism 240. As mentioned above, the compatibility mechanism 240 maintains a mapping that allows for organizing information properly within the fields of the data store 220. This mapping also allows the compatibility mechanism to match a lowest shared field between interacting instances, thereby enabling communication across multiple versions of the service application 215 with a common data structure. To enable communication between disparate versions, the compatibility mechanism 240 (e.g., using a talk-down pattern) is equipped to perform the proper forward and/or backward transformations to the data structures of information to allow role instances running other versions of software to read and interpret the information.

As illustrated in FIG. 2, the compatibility mechanism 240 is located in an area that is separate from the core logic of the service application 215 (as indicated by the dashed line). In one embodiment, the compatibility mechanism 240 includes declarative components that are positioned in a subset of supportive code, as compared to core logic, at the edge of the service application 215. As shown, the area in which the compatibility mechanism is located is a data-access layer 230 of the cloud-computing infrastructure 210. In this location, the compatibility mechanism 240 provides a view of the information within the data store specific to versions of the service application 215. For example, version 1 has a specific definition of a view of the information it can read and interpret within a table of the data store 220, while version 2 has a different has a different specific definition of a view of the information. Thus, the compatibility mechanism 240 instantiated within the data-access layer 240 handle that complex task of transitioning data according to an expected view, while the core logic of the service application 215 is allowed to write information to the latest version of software and is not concerned with the multi-complexities of the mapping and functionality encompassed specifically by the compatibility mechanism 230. That is, the complexity of mutating the information between data structures and storing to various fields is isolated into a few discrete components within the compatibility mechanism 240. Thus, the replication and propagation of various changes to the data structure are thus transparent to the core logic.

For the purpose of explanation, an exemplary embodiment of the operation of the compatibility mechanism 240 is provided below. Assume there exists a service application that functions to identify and write to a storage location the health of a node. Also assume that the service application is undergoing an update, where some role instances are running version 1 and other role instances are running version 2 within the service application. In this example, version 1 is configured to output three values for entry into the field of the data store 220: powered off, active, and out for repair. Differently, version 2 is configured to output four values: those from version 1 and under certification, which designates that the node was previously out for repair and is now being integrated within the network via certification.

Because version 2 was developed after version 1, the software of version 2 takes into account the outputs of version 1 and streams outputs into two fields of the data store 220, one corresponding to the outputs of version 1 and another that accepts the information written by version 2. That is, later versions are equipped to produce at least two streams of output in parallel: a first that is usable by version 1, and a second that is specific to the later version (version 2). In this case, if the version 2 identifies the node is under certification, it will write to a field associated with version 1 "out for repair" and will write to a field associated with version 2 "under certification."

This process of down-mapping from the version-2 form (e.g., data structure with four outputs) to the version-1 form (e.g., data structure with 3 outputs) allows the lower versions of the service to read and interpret the data being written by the higher versions of the service. This down mapping may be implemented locally by the role instances running the high versions of the software (e.g., version 2) or centrally at the isolated compatibility mechanism 240, isolated from the core logic of the service application 215. When implemented by the compatibility mechanism 240, a protocol that employs a talk-down pattern may be instituted in one embodiment. The talk-down pattern allows later versions to communicate, or "talk down," to the earlier versions. In this protocol, the compatibility mechanism 240 determines the highest version of software that two role instances have in common and enables the role instances to interact within that common version. Thus, the talk-down pattern allows particular versions to communicate with versions of the service that are older.

Generally, there is a range of versions that are eligible to communicate with one another (i.e., between the basement version 1 and the latest version 3 of FIG. 2), which are valid for the service application 215. Accordingly, every version of software installed to the service application 215 that is not the basement version (e.g., version 1) is configured with a definition of the basement version, which the later versions (e.g., version 2 and 3) will attempt to support. Thus, the later versions are enabled to write information for each of the versions in the range, including the basement version, in parallel to data stores. This definition of the basement version may be gleaned from settings of the service application as it is running in the network. The settings may also indicate which versions are not active in the service application, thereby reducing the number of streams of data that the later versions will output.

In the example above, the protocol that allows the talk-down pattern to be implemented pervades the code within the service application. This approach adds both complexity and overhead across the network and service. In other embodiments of the present invention, the protocol that allows the talk-down pattern is centralized within the compatibility mechanism 240, along with the definition of the basement version gleaned from settings of the service application. As such, the complexity is removed from the role instances (core logic) of the service application 215 and placed into the responsibility of the compatibility mechanism, which is outside the core logic.

The operation of the state machine 255 in cooperation the rules for transitioning the streaming information streaming handled by the compatibility mechanism 240 enables the data-structure definitions used by a particular version of the service application 215 to be annotated such that the backward and forward transformations occur automatically, and within a data-access layer 230. Consequently, the core logic of the service application 215, with the compatibility mechanism 240 in communication therewith, may be written to assume an execution environment that is homogeneous, with all role instances 260, 270, appearing to operate at the current version. In other words, the compatibility mechanism 220 isolates the version compatibility logic, or protocols, to a subset of the service application's supportive code and away form the core logic.

It will be understood and appreciated that the architecture 200 of the cloud-computing infrastructure shown in FIG. 2 is merely an example of one suitable computing system environment and is not intended to suggest any limitation as to the scope of use or functionality of embodiments of the present invention. For instance, the cloud-computing infrastructure may be a public cloud, a private cloud, or a dedicated cloud. Neither should the cloud-computing infrastructure be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of nodes, virtual machines, data centers, role instances, versions of software or combinations thereof may be employed to achieve the desired functionality within the scope of embodiments of the present invention.

The architecture 200 of the cloud-computing infrastructure 210 generally includes a data center configured to host and support operation of role instances 260, 270, and 280 of a particular service application, in this case service application 215. The phrase "service application," as used herein, broadly refers to any software, or portions of software, that runs on top of, or accesses storage locations (e.g., data store 220) within the data center. In one embodiment, one or more of the role instances 260, 270, and 280 may represent the portions of software, component programs, or instances of roles that participate in the service application. In another embodiment, one or more of the role instances 260, 270, and 280 may represent stored data that is accessible to the service application 215. It will be understood and appreciated that the role instances 260, 270, and 280 shown in FIG. 2 are merely an example of suitable parts to support the service application and are not intended to suggest any limitation as to the scope of use or functionality of embodiments of the present invention.

The nodes 265, 275, and 285 of the data center may be dynamically allocated to endpoints (e.g., the role instances 260, 270, and 280) to satisfy the current processing load of the service application 215. In one instance, a fabric controller, or fabric of the cloud-computing infrastructure 210, is responsible for automatically managing and for placing the role instances 260, 270, and 280 and other resources (e.g., software components) within the data center. By way of example, the fabric controller may rely on a service model (e.g., designed by a client 290 that owns the service application 215) to provide guidance on how, where, and when to place the role instances 260, 270, and 280.

Per embodiments of the present invention, the nodes 265, 275, and 285 represent any form of computing devices, such as, for example, a personal computer, a desktop computer, a laptop computer, a mobile device, a consumer electronic device, server(s), the computing device 100 of FIG. 1, and the like. In one instance, the nodes 265, 275, and 285 host and support the operations of the service application 215, while simultaneously hosting other services and/or role instances carved out for supporting other tenants of the data center 225. In other embodiments, the role instances 260, 270, and 280 may include endpoints of distinct service applications owned by different customers.

Typically, each of the nodes 265, 275, and 285 include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes 265, 275, and 285 to enable each device to perform a variety of processes and operations. In another instance, the computing unit may encompass a processor (not shown) coupled to the computer-readable medium (e.g., computer storage media and communication media) accommodated by each of the nodes 265, 275, and 285. Generally, the computer storage medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

The role instances 260, 270, and 280 that reside on the nodes 265, 275, and 285, respectively, support operation of service application(s), and may be interconnected via application programming interfaces (APIs). In one instance, one or more of these interconnections may be established via a network cloud (not shown). The network cloud serves to interconnect resources, such as the role instances 260, 270, and 280, which may be distributably placed across various physical hosts, such as nodes 265, 275, and 285. In addition, the network cloud facilitates communication over channels connecting the role instances 201 and 202 of the service applications running in the data center. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

The state machine 250 may comprise a single software component (e.g., residing on node 255) or may be partitioned into a plurality of distinct software components that interact with each other to govern the rollout or roll back of an update within the nodes 255, 265, 275, and 285 of the data center. In one embodiment, the state machine 255 may be included within or operably coupled to the fabric controller, running in a centralized location within the data center. In another embodiment, the state machine 255 may be provisioned as at least one stand-alone compute entity running in the fabric of the cloud-computing infrastructure 210. Generally, in operation, the state machine 255 employs predefined procedures to initiate an update, to validate the updated instances, and, based on the validation, to decide whether to continue with the upgrade or invoke a downgrade of the updated instances. One instance of the predefined procedures used by the state machine 255 when rolling out or rolling back an update is depicted in the upper-level organization structure, which diagrams some of the steps performed by the state machine 255.

In embodiments, the state machine 255 uses the state of the service application 215 to carry out its predefined procedures during an update. As used herein, the term "state" is not meant to be limiting but may include any data that describes a configuration of a service application or any other software running in the cloud-computing network 210. In one instance, the state may comprise any data that the state machine 250 deems important to updating a version of the service application. Accordingly, the state may be any data that is perceived from the service application 215, which the fabric controller is allowed to view, and that is employed in conducting a roll out or roll back accordingly to embodiments of the present invention.

Process Flows

Exemplary methods for a roll out or roll back accordingly to embodiments of the present invention are described with reference to FIGS. 3-5. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 3:
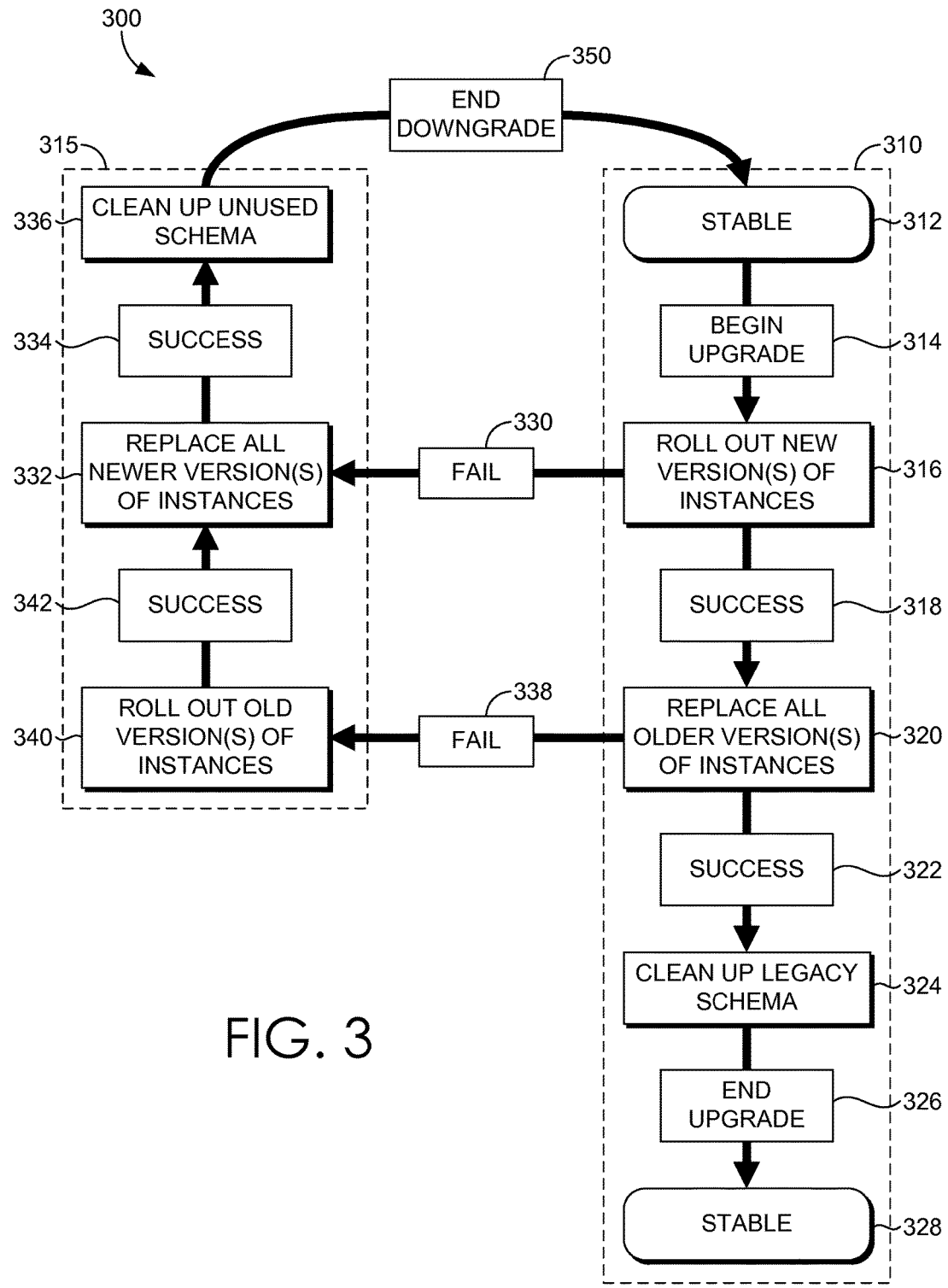
FIG. 3 is a flow diagram showing an overall method for performing an upgrade to the service application that is transparently reversible to a client of the cloud-computing infrastructure, in accordance with an embodiment of the present invention.
Figure 4:
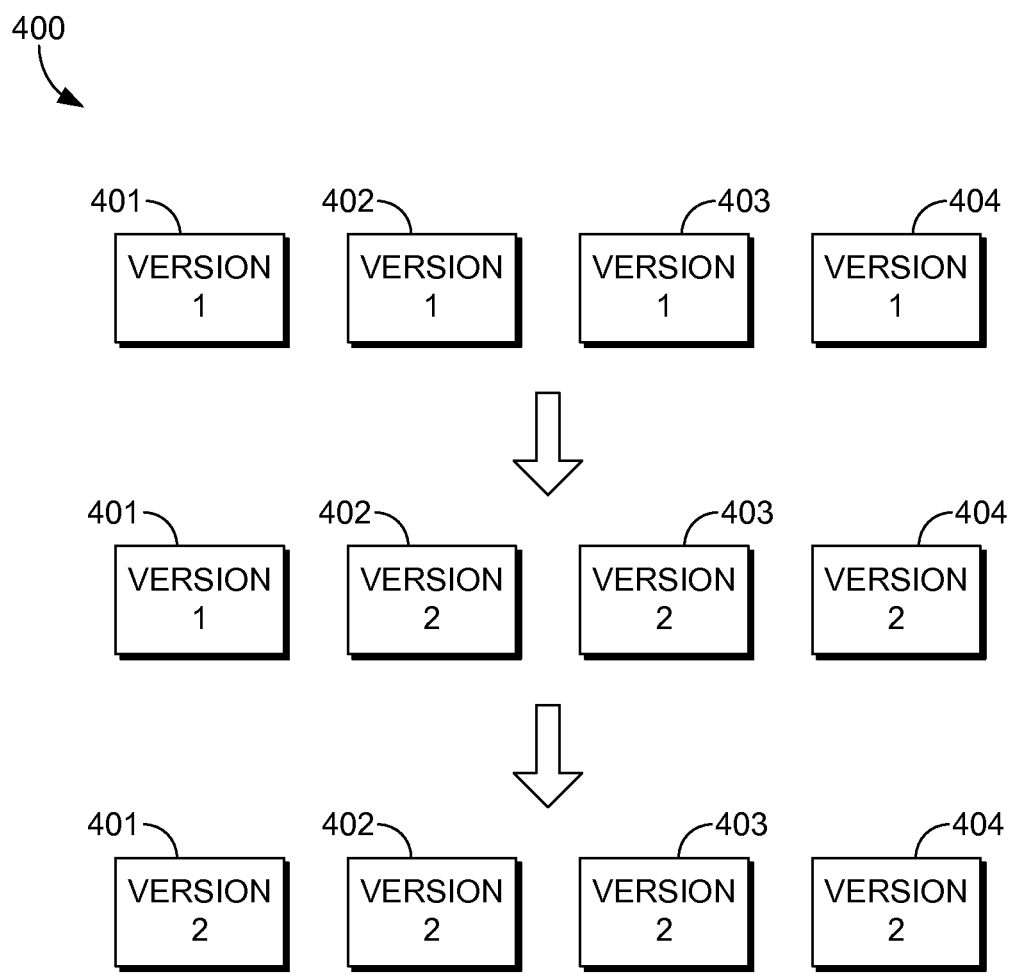
FIG. 4 is a diagrammatic view of role instances of a service application that are experiencing an upgrade, in the context of embodiments of the present invention.

Turning to FIG. 3, a flow diagram showing an overall method 300 for performing an upgrade to the service application that is transparently reversible to a client of the cloud-computing infrastructure is shown, in accordance with an embodiment of the present invention. It should be noted that, although the terms "step" and/or "block" may be used herein to connote different elements of methods employed, the terms should not be interpreted as implying any particular order among or between various steps herein disclosed unless and except when the order of individual steps is explicitly described.

Initially, the method 300 involves scaling out a service application within the cloud-computing infrastructure such that many role instances are running in a stable condition, as indicated at block 312. In this way, the service application that instantiates multiple copies of roles for increased availability to the consumers of the cloud-computing infrastructure (e.g., client 290 of FIG. 2). It should be noted that, although one type of consumer is depicted in FIG. 2, embodiments of the present invention contemplate a variety of consumers beyond the client 290. For instance, consumers may range from an individual customer, to a business entity, to a private enterprise network. In addition, the service application(s) being hosted by the cloud-computing infrastructure 210 of FIG. 2 may include external-based applications, such as software provided by a client 290 (e.g., customer tools and other tenants), or the services may include internal-based application, such as software developed for managing the network (e.g., fabric controller—replicated highly available service).

The role instances of the service application, at block 312, typically share a common state and protocol definitions between the copies. Thus, at this point there is a range of versions that are known to correctly interact. This range of versions forms a range between an initial "basement version" to an initial "latest version," where each of the multiple, simultaneously running versions of the service application coexist within the data center and share a state as well as a unified outward appearance to the user.

By way of explanation, the basement version (BV) and the latest version (LV) are state variables maintained through the predefined procedures of the update to the software, and which role instances of the service application honor. Generally, the BV represents the oldest version that is valid to run the service application, while the LV represents the newest version that is valid to run the service application. With reference to FIG. 2, the embodiment illustrated shows version 1 as the BV and version 3 as the LV. Further, there are values "s" and "n" that may be attached to the state variables. When the value of "s" is attached to the state variables (e.g., BVs and LVs), the resultant terms denote the starting condition of the service application prior to an update. When the value of "n" is attached to the state variables (e.g., BVn and LVn), the resultant terms denote the goal condition of the service application upon carrying out the update.

As such, even when there are many versions of software interacting to provide functionality to the service application, it appears to an outside perspective that there is a single, resilient service running within the cloud-computing infrastructure. At this point, the service application may begin an upgrade of its software.

As indicated at block 314, the update involves upgrading the service application. For purposes of clarification, the blocks within the area 310 generally represent steps performed during a version upgrade (rolling out an update of software) (see FIG. 4), while the blocks within the area 315 generally represent steps performed during a version downgrade (rolling back an update of software) (see FIG. 5). As indicated at block 316, an upgrade to the service application is initiated by rolling out new version(s) of role instances. The process of rolling out typically involves incrementally updating role instances of a service application that is active on the network, by bringing offline a small cluster of role instances, installing the update, and bringing them back online. Thus, the rolling update allows the service application to be highly available during the entire update, as opposed to shutting a large portion of a service.

As mentioned above, the scaled service application includes role instances that are within a known valid range of versions, from the BV to the LV. The state variables LV and BV at the initial roll out of the update may be explained using the diagrammatic view of role instances 401-404 of a service application that are experiencing an upgrade in FIG. 4. Initially, all role instances 410-404 are running version 1 in a stable manner; thus, BV equals LV.

During the upgrade, the values of the state variables BV and LV are changed to reflect the new versions being released and rolled out with the update. As illustrated, role instances 402-404 are upgraded from version 1 to version 2, while allowing the remainder (role instance 401) to continue running version 1. Thus, a new version of software is incorporated into the range, moving the designation of LV from version 1 to version 2. At this point, the service application is allowed to run any version in between the BVs and the LVn.

Further, for the service application to function properly, versions 1 and 2 should coexist (i.e., share a state). In order to coexist, the state machine instructs that various actions take place. In one instance, information to be used by version 2 is replicated within the data store and elsewhere such that the information is formatted in a data structure consistent with version 2. In another instance, the compatibility mechanism enables the versions 1 and 2 to behave consistently and interact seamlessly by isolating the complexity of the multi-version service from the core logic of the service-application implementation (e.g., allowing for rolling forward and backward in a safe manner). At this point, the visible features of BVs (version 1) are exposed to a client of the cloud-computing network (e.g., UIs, APIs, and other outputs) via a protocol within the state machine, while the features specific to LVn (version 2) are hidden from the client. This is because version 2 is not fully testing and should not be revealed to the client in order to provide consistency and eliminate confusion, even though version 2 is running on multiple role instances. In this way, the BV represents the oldest version of software that is allowed to run on the network and defines the features exposed (e.g., via an interface) to the client.

As more role instances receive version 2 and as version 2 is successfully validated within the network, a decision may be made by the state machine to disallow older version(s) of the software from running. This step is illustrated in FIG. 4 where the remaining role instance 401 is updated from version 1 to version 2. Once tested for validation as a whole, each of the features LVn (version 2) of the service application is allowed to be exposed to the client. Further, the state machine then moves the designation of BV from BVs (version 1) to BVn (version 2), thereby allowing the service application to run in version 2 as a whole. The data items that are no longer recognized by a version within the range between BV and LV are removed.

Reiterating with respect to FIG. 3, when the roll out of certain instances of version 2 is successful (see block 318), all role instances of the service application may be upgraded to version 2 (see block 320). Once the older versions (BV) are all replaced by the latest version (LV), the BVs (version 1) is designated as BVn (version 2) within the state machine and BVn is exposed to the client. If the upgrade of each role instance to BVn is successful (see block 322), clean-up of legacy schema associate within version 1 commences (see block 324). As indicated at block 326, the version upgrade 310 is finished. At this point, the BVn is designated as BVs in anticipation of a future update and the range of versions between BVs to LVn represents the software that is now allowed to be run by the service application.

Much like the rollout path (version upgrade 310), the "rollback path (version downgrade 315) functions to modify the allowed range between the BV and LV. By leveraging the rules determined in the rollout path, the state machine is able to determine those rollback operations that would not be visible to the client (e.g., consumers of the service or any users that may interface with the service)

For example, if the rollout of the new version(s) (see block 316) were to fail (see block 330), a reverse rollout along a first failure path may be invoked by the state machine. In this scenario, the reverse rollout along the first failure path is able to move instances of version 1 back into the service without creating confusion at the client. This is because version 1 remained designated as BVs and was not changed to a designation of BVn, which was version 2 in this case. Further, because the BV dictates those features that are exposed to the client, the reverse rollout of replacing role instances running newer version 2 with role instances running older version 1 is transparent to the client (see block 332). This advantageous transparency is due to the fact that no feature that was unique to version 2 was exposed to the client during the version upgrade 310 to this point.

If the reverse rollout is successful (see block 334), the unused schema associated with LVn (version 2) is cleaned up (see block 336) and the version downgrade is finished (see block 350). In one instance, the clean-up of LVn involves deleting any state information that was added by version 2 (e.g., wipe traces of specialized settings or data created by or surrounding version of version 2 and a history of its operations from the network). In another instance, the clean-up of LV the state machine directing the removal of any information acquired in the data store that was specific to version 2, as version 2 may have created additional information that was not generated by version 1.

Figure 5:
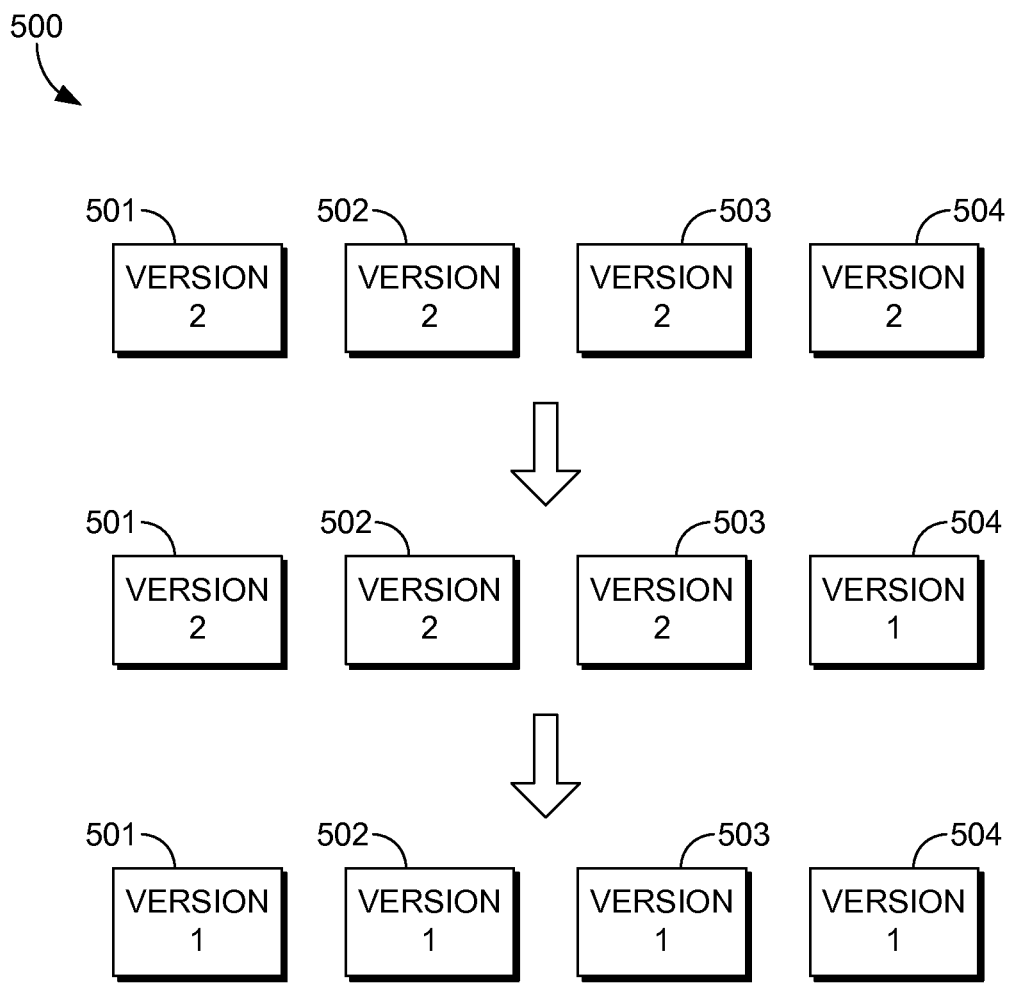
FIG. 5 is a diagrammatic view of role instances of a service application that are experiencing a downgrade, in the context of embodiments of the present invention.

Turning to FIG. 5, a diagrammatic view of role instances of a service application that are experiencing a downgrade is shown in the context of embodiments of the present invention. Specifically, the transition from row two to row three demonstrates an example of a reverse rollout when a failure occurs upon upgrading just a portion of the role instances of the service application and a failure is detected (see blocks 316, 330, and 332 of FIG. 3). Alternatively, the transition from row one to row three demonstrates an example of a reverse rollout when a failure occurs upon upgrading all of the role instances of the service application and a failure is detected (see blocks 320, 338, and 340 of FIG. 3).

Referring back to FIG. 3, the failure path from block 320 will now be discussed, as introduced by the discussion immediately above. Upon replacing all older versions (version 1) with newer versions (version 2), the state machine changes the designation of BVs (version 1) to BVn (version 2). At this point, the features of version 2 are exposed to the client. When a failure is detected when running the entire service application at the LVn (version 2), as indicated at block 338, a failure path is invoked. The failure path initiating the version downgrade 315 at block 340, where the BVn (version 2) is rolled back to the BVs (version 1) and role instances running version 2 are replaced with role instances running version 1. This roll back may involve manually identifying data specific to BVn (version 2) and converting the data to be read and interpreted by BVs (version 1). Or, the roll back may involve automatically cleaning up UIs and other features specific to of the version 2. This clean-up step of BVn is apparent to the client, as the UIs and other features specific to of the version 2 disappear from the client's visibility of the service application. Once the initial roll back is successful (see block 342), the failed newer version may be backed out completely upon the state machine designating LVn (version 2) as LVs (version 1) (see block 332).

As part of this, note that specific restrictions apply as to the behaviors allowed at each step of the flow chart of FIG. 3. For instance, any exposed feature must be supported by all versions from the basement version onwards. This is to support the rollback path of the state machine.

Any of the acts of any of the methods described herein may be implemented at least partially by a processor or other electronic device based on instructions stored on one or more computer-readable media.

Although the invention has been described in language specific to structural features and/or methodological acts, it is to be understood that the invention is not necessarily limited to the specific features or acts described. Rather, the specific features and acts are disclosed as exemplary forms of implementing the invention. That is, embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer storage media having computer-executable instructions embodied thereon that, when executed, perform a method for performing an upgrade to a service application that is transparently reversible to a client of a cloud-computing infrastructure, the method comprising:
receiving instructions to upgrade the service application running on top of the cloud-computing infrastructure, wherein the service application includes core logic for carrying out core operations and supportive code that is distinct from the core logic;
maintaining a first set of role instances at an earlier first version of the service application, wherein the role instances respectively represent a replication of at least one role, wherein the service application includes protocol definitions that expose features of the earlier first version to the client, the protocol definitions are shared between versions of the service application;
designating the first version as a basement version within a state machine;
upgrading a second set of role instances to a newer second version of the service application, wherein the protocol definitions prevent exposure of features specific to the second version to the client;
designating the second version as a latest version, wherein a compatibility mechanism located in a subset of the supportive code is responsible for allowing the basement version, the latest version, and other versions of the service application there between to interact, wherein the compatibility mechanism maintains a mapping to a data store to organize information communicated to the data store, from role instances, based on corresponding data structures associated with service application versions, wherein writing information from the second role instances to the fields in the data store is based on an output from the second role instances, the output comprising a plurality of parallel streams for corresponding data structures associated with service application version information.

2. The media of claim 1, wherein the compatibility mechanism resides within a data-access layer of the cloud-computing infrastructure and is capable of writing information from the first and second role instances to the fields in the data store.

3. The media of claim 1, wherein the first and second set of role instances run on nodes, respectively, distributed within the cloud-computing infrastructure, and wherein the nodes include at least one of computing devices, processing units, or servers.

4. The media of claim 3, the method further comprising validating the second set of role instances running the second version of the service application functions properly within the cloud-computing infrastructure.

5. The media of claim 4, the method further comprising:
upon conducting the validation of the second set of role instances, initiating downgrading the second set of role instances from the second version to the first version of the service application when a failure is detected; and
designating the first version as the latest version within the state machine.

6. The media of claim 4, the method further comprising:
upon conducting the validation of the second set of role instances, initiating upgrading the first set of role instances from the first version to the second version of the service application when no failure is detected; and
designating the second version as the basement version within the state machine.

7. The media of claim 6, wherein the upgrade of the first set of role instances to the second version is transparent to the client until after the second version is validated.

8. The media of claim 7, the method further comprising validating the first set of role instances running the second version of the service application functions properly within the cloud-computing infrastructure.

9. The media of claim 8, the method further comprising:
upon conducting the validation of the first set of role instances, initiating downgrading the first and second set of role instances from the second version to the first version of the service application when a failure is detected; and
performing a clean-up operation to remove schema specific to the second version.

10. The media of claim 9, wherein the downgrade of the first and second set of role instances to the first version is apparent to the client.

11. The media of claim 9, the method further comprising designating the first version as the basement version within the state machine.

12. The media of claim 8, the method further comprising, upon conducting the validation of the first set of role instances, performing a clean-up operation to remove schema specific to the first version when no failure is detected.

13. A computerized method for isolating a data structure transformation between versions of role instances of a cloud-computing infrastructure, the method comprising:
receiving at a compatibility mechanism information from a first set of role instances of a service application, wherein the first set of role instances reside at a first version of the service application and format the information according to a first data structure, wherein the compatibility mechanism maintains a mapping to a data store to organize information communicated to the data store, from role instances, based on corresponding service application versions;

writing the information from the first set of role instances to a first field;

receiving at the compatibility mechanism information from a second set of role instances of the service application, wherein the second set of role instances are upgraded to a second version of the service application and format the information according to the first data structure and a second data structure in parallel, wherein writing information from the second role instances to the fields in the data store is based on an output from the second role instances, the output comprising a plurality of parallel streams for corresponding data structures associated with service application version information; and writing the information from the second set of role instances to the first field and a second field, respectively, according to the first and second data structure.

14. The computerized method of claim 13, wherein the compatibility mechanism allows the first and second set of role instances to interact using information in the first data structure.

15. The computerized method of claim 13, wherein the first and second set of role instances respectively represent a replication of at least one role, which resembles a component program that supports particular functional aspects of the service application.

16. The computerized method of claim 13, wherein core logic of the service application is programmed for carrying out core operations.

17. The computerized method of claim 13, wherein the second version running on the second set of role instances is transparent to the client.

18. A system for performing a method that upgrades a service application in a manner transparent to a client of a cloud-computing infrastructure, the system comprising a processing unit coupled to a computer storage medium, the computer storage medium having stored thereon a plurality of computer software components executable by the processing unit, the computer software components comprising:

a first set of role instances running a first version of the service application upon one or more nodes, respectively, within the cloud-computing infrastructure, a second set of role instances running a second version of the service application upon one or more nodes, respectively, within the cloud-computing infrastructure, a state machine for designating the first version as a basement version and the second version as a latest version; and a compatibility mechanism responsible for allowing the basement version, the latest version, and other versions of the service application there between to interact using a data structure associated within the first version, wherein the compatibility mechanism maintains a mapping to a data store to organize information communicated to the data store, from role instances, based on corresponding data structures associated with service application versions, wherein writing information from the second role instances to the fields in the data store is based on an output from the second role instances, the output comprising a plurality of parallel streams for corresponding data structures associated with service application version information.

19. The system of claim 18, wherein the service application includes protocol definitions that expose features of the first version to the client, and wherein the protocol definitions prevent exposure of features specific to the second version to the client.

20. The system of claim 19, wherein the one or more nodes represent computing devices capable of distributively hosting tenants of the service application within the cloud-computing infrastructure, wherein the computing devices are capable of distributively hosting role instances within the cloud-computing infrastructure, and wherein the role instances are designed for carrying out particular functional aspects of the service application.

* * * * *